United States Patent Office 3,783,036
Patented Jan. 1, 1974

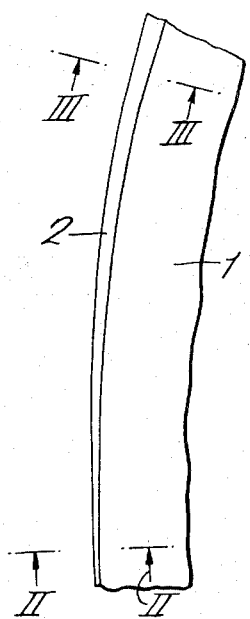
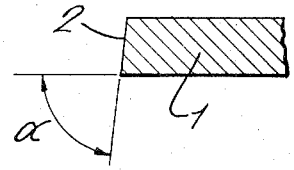
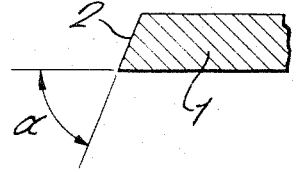
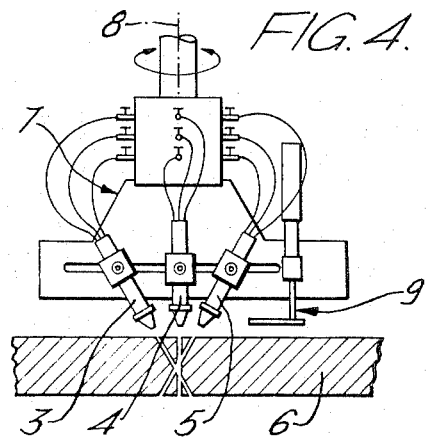

3,783,036
METHOD OF CUTTING THE EDGE OF STRUCTURAL SHEET OR PLATE MEMBERS ON AUTOMATICALLY CONTROLLED CUTTERS
Borre Bengt Ulrichsen, Kongsberg, Norway, assignor to A/S Kongsberg Vapenfabrikk, Kongsberg, Norway
Filed Oct. 21, 1971, Ser. No. 191,484
Claims priority, application Norway, Oct. 21, 1970, 3,983/70
Int. Cl. B23k 7/10
U.S. Cl. 148—9 R      6 Claims

ABSTRACT OF THE DISCLOSURE

A varying bevel angle of an inclined edge of a steel plate is provided in the same operation as that of cutting the contour of the plate on a numerically controlled blowpipe cutter. A cutter with a rotatable cutter head is used. A blowpipe nozzle is positioned at an angle with the rotational axis of the cutter head and the movement of the head about the axis is controlled both in accordance with information relating to the desired bevel angle and in accordance with the direction of the tangent to the edge in the plane of the plate to be cut.

BACKGROUND OF THE INVENTION

The present invention relates to a method of cutting the edge of structural sheet or plate members, for instance for use in bulkheads, on automatically controlled cutters. The most common example of such cutters is cutting blowpipe machines, but the invention may also be in connection with other cutting machines working in a similar manner without any chip-removing effect, even if no ordinary burning of the sheet or plate material, i.e. a reaction with oxygen, takes place. Such apparatus will be generally designated as cutters, and the element corresponding to the burner or blowpipe nozzle of a blowpipe cutter will be designated as a cutting nozzle.

The exterior edge of longitudinal girders or transverse bulkheads in ships, i.e. the edge which is to be welded to the shell plating of the ship, shall not always be perpendicular to the plane of the girder or bulkhead since the edge must be fitted to the shell plating to which the girder or the bulkhead plate is to be welded. The angle formed by the edge with the plane of the plate in section perpendicularly to the plate and the edge may further vary within one and the same plate since the shell plating does not always form the same angle with the plane of the plate over the entire length of the plate. Hitherto it has not been possible to obtain such a varying edge angle by burning on automatically, for instance numerically, controlled cutters, and the edge has therefore required further trimming after the cutting operation.

SUMMARY OF THE INVENTION

The object of the present invention is to provide a method of cutting the edge, which permits this subsequent trimming to be dispended with.

The method according to the invention is characterized in that during the cutting operation a cutting nozzle is adjusted to a varying angle of attack in order to make the angle between the plane of the sheet or plate member and the edge to be cut, when viewed in section perpendicularly to the plate and the edge, vary along the length of the edge.

For the cutting operation a numerically controlled cutter having a three-axes control may be used. In this connection the number of axes designates the number of independent movements controlled. Thus, if a cutter has two cutting heads, the movements of which in one coordinate direction are controlled jointly, the heads being independently movable in the other coordinate direction, three control axes are required, and such a machine is called a three-axes controlled cutter. If such a three-axes controlled cutter is used, only one of the cutting heads will be used at a time, and the control circuit for the axis that is not required for guiding this cutting head along the edge of the plate, may be used in controlling the angle of attack of the cutting nozzle. Alternatively, the angle of attack may be controlled stepwise from the punched tape or the like of the numerically controlled cutter.

In principle it is possible to mount the cutting nozzle so as to be pivotable in a plane perpendicularly to the travelling direction of the nozzle and control the pivoting movement in this plane in accordance with the desired edge angle. However, such an embodiment entails some problems since the pivoting center must then lie in the plane of the upper surface of the plate in order to avoid problems with adjusting the cutting nozzle in its longitudinal direction in order to obtain a constant distance in this direction between the point of the nozzle and the plate. As will be apparent from the following description it is appropriate under certain circumstances that in pivoting the cutting nozzle the lower end of the cut should remain unchanged, i.e. the pivoting center of the cutting nozzle should lie in the plane of the lower surface of the plate. However, when the cutting nozzle is pivoted in a plane perpendicularly to the travelling direction of the cutting head or the longitudinal direction of the edge, such a pivoting center will lead to a varying distance between the point of the nozzle and the plate, which variation would have to be compensated by displacing the cutting nozzle in its longitudinal direction. Further, in this case the length of the cut will vary with the edge angle. Finally, one must bear in mind that the edge is usually curved in the longitudinal direction, so that the pivoting plane must be turned in order continuously to extend perpendicularly to the travelling direction.

These circumstances entail that in the preferred embodiment known automatically controlled cutters having rotatable three-nozzle heads are used. It has been found that in spite of the fact that such rotatable three-nozzle heads have not been developed with a view to achieving a varying edge angle, they may still advantageously be used for this purpose. Such three-nozzle heads are usually employed in the cutting of plates for obtaining a so-called K-cut, in which the finished edge of the plate, when viewed in a section perpendicularly to the plate and the edge, has a central portion which extends normally to the plane of the plate, a bevel being provided on both sides of this central portion. The nozzle head carries three cutting nozzles, which prior to the cutting operation may be adjusted on the nozzle head in accordance with the desired edge profile. In order to maintain an edge profile with fixed bevel angles, the nozzle head must always have the same angle relatively to a plane perpendicularly to the plate and the edge. When the edge is curved in the longitudinal direction, the nozzle head must therefore turn as the cutting proceeds in order continuously to have the same position relatively to the edge to be cut. The nozzle head is therefore rotatably mounted, and the rotation is controlled in accordance with the tangent to the edge at all times.

However, this rotatable mounting of the nozzle head may, according to the invention, be used for providing a varying edge angle. For this purpose one of the cutting nozzles may be positioned in the nozzle head at an angle which at least corresponds to the largest desired angular deviation from a perpendicular edge. The deviation from a perpendicular edge during cutting may then be adjusted continuously or stepwise between the angle at which the cutting nozzle is mounted in the head, and an angle of zero. The largest edge angle will be obtained when the cutting nozzle lies in a plane perpendicularly to the edge, whereas a perpendicular edge is obtained when the cutting nozzle lies in a tangent plane to the edge. Thus, the desired variation of the angle is obtained by turning the nozzle head about its axis, which is perpendicular to the plane of the plate.

Thus, in accordance with a preferred embodiment of the method of the invention there is used an inclined cutting nozzle that during the cutting operation is fixedly mounted on a head that is rotatable about an axis substantially perpendicular to the plane of the sheet or plate, the rotation of said head, in addition to being controlled by the course of the edge in its longitudinal direction, being also controlled in accordance with the desired variation of the edge angle.

The invention will now be explained in more detail, reference being had to the accompanying drawing.

DETAILED DESCRIPTION OF THE DRAWING

FIG. 1 is a fragmentary view of the edge portion of a finished ship's plate.

FIGS. 2 and 3 are sections along the lines II—II and III—III, respectively, in FIG. 1.

FIG. 4 is a diagrammatical elevation of a rotable three-burner head of known design.

Figure 5:
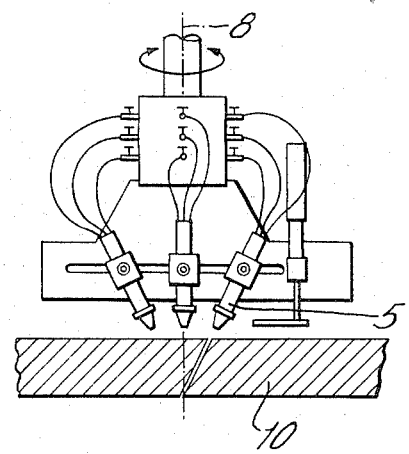
Figure 6:
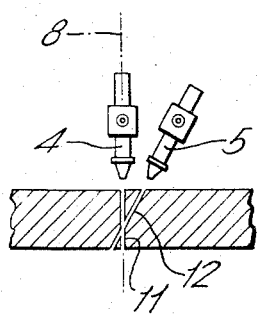
Figure 7:
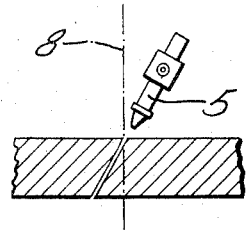

FIGS. 5–7 diagrammatically illustrate various adjustments of the burners when the three-burner head is used for cutting an edge with varying inclination.

An example of the shape of an edge of a ship's plate 1 to be cut is illustrated in FIGS. 1–3. The edge 2 is curved in the longitudinal direction and further forms the angle $\alpha$ with the plane of the plate 1. The angle $\alpha$ may vary along the length of the edge as illustrated in the drawing.

As referred to, FIG. 4 is a diagrammatical elevation of a rotatable three-burner head 7 of known design shown in connection with the cutting of a so-called K-cut for producing a plate 6 having an edge that is bevelled on the lower side as well as the upper side of the plate. As illustrited, the burner head 7 carries three burners 3, 4 and 5 which may be adjusted in desired positions relatively to each other on the burner head 7. The burners 3, 4 and 5, which are all positioned in planes perpendicular to the edge, are somewhat offset relatively to each other in the travelling direction, i.e. perpendicularly to the plane of the drawing. The reason therefore is that the burners and the cutting operations performed by them shall not interfere with each other. As indicated in FIG. 4, the burner head 7 is rotatably mounted about an axis 8 which extends perpendicularly to the plane of the plate 6. The purpose of this rotatable mounting of the burner head is to permit the head, when cutting a curved edge, to maintain a fixed position with respect to this edge so that the angles of the bevels will be constant.

The burner head 7 further has a sensing means which is indicated at 9, and which actuates a vertical adjustment means for the burner head 7 in order to maintain the points of the burners at a fixed distance above the plate 6 during the cutting operation.

However, according to the invention this rotatable mounting of the burner head may also be used for achieving a varying angle $\alpha$. Thus, FIG. 5 illustrates the use of the burner head 7 in the preparation of an edge 2 of a shape illustrated in FIGS. 2 and 3. Only the inclined burner 5 is in operation. This burner 5 is adjusted to a fixed position with respect to the burner head 7, for instance at an agle thereto corresponding to the lowest value of the angle occurring in practice and so that the axis of the burner, when viewed in the tangential direction of the edge, intersects the axis 8 in the plane of the lower surface of the plate 10 that is cut. In this case, the contour of the plate formed by the lower end of the inclined edge will correspond to the curve along which the axis 8 of the burner head is moved. During the burning operation the angle of the edge 2 may be varied in accordance with the desired value by rotating the burner head 7 about the axis 8, the angle $\alpha$ increasing to 90° when the burner head 7 is rotated to a position in which the axis of the burner 5, when viewed in plan, lies in the longitudinal direction of the edge.

FIG. 6 illustrates the burning of a bevelled edge having a so-called nose, i.e. a portion 11 extending perpendicularly to the plane of the plate. Such an edge is obtained by using two of the burners, one inclined burner 5 and a burner 4 the axis of which coincides with the axis of rotation. By rotating the burner head about the axis 8 the same effect is obtained with respect to the shape of the edge as if the burner 5 were pivoted about an axis which passes through the intersection between the axes of the burners 4 and 5 when viewed in the tangential or longitudinal direction of the edge, and which itself extends in this direction. When the burner 5 is positioned as illustrated in FIG. 5, the rotation will correspond to a pivoting of the burner 5 about an axis in the plane of the lower surface of the plate. In FIG. 7 a position of the burner 5 relatively to the axis 8 is illustrated, which position entails that a rotation about the axis 8 will correspond to a pivoting about an axis in the plane of the upper surface of the plate. In this case it is the contour of the upper surface of the plate which corresponds to the curve along which the axis 8 is moved. If the available data defining the contour of the plate, define the contour of the lower surface of the plate, such data may still be used for controlling the burner head, if a correction is introduced, such correction being a function of the bevel angle and, of course, also of the thickness of the plate.

The burner 5 may thus be adjusted so that its axis, when viewed in the tangential or longitudinal direction of the edge, intersects the rotational axis 8 of the head in the plane of the lower surface or the upper surface of the plate or in an intermediate plane. A rotatable three-burner head thus provides a great flexibility with respect to determining the apparent pivoting point of the burner 5 when viewed in section perpendicularly to the edge, without the "pivoting" introducing difficulties due to a variation of the distance of the point of the burner from the plate. By using such a three-burner head use is made of the ability of the head to rotate which in any case is required in order that the burner head may adjust itself to a curved course of the edge.

If a numerically controlled blowpipe cutter having a three-axes control is used, the control circuit for the axis that is ordinarily used in controlling the cutter head that is not used in the bevel cutting operation according to the invention, and which thus is idle, may be used for controlling the angular position or the angle of attack of the burner. If desired, the angle of attack of the burner may be controlled stepwise from the punched tape or the like of the numerically controlled cutter.

The use of a rotatable burner head having several burners also entails the substantial advantage that in addition to an inclined burner for preparing a bevel edge with varying inclination a burner 4 may be used, the axis of which coincides with the rotational axis 8. Firstly, this allows the burning of an edge with a nose as illustrated in FIG. 6. Secondly, such a burner 4 makes it possible to switch over to a burning with this burner only, the burner 5 being out of operation, when shifting from the cutting of an edge having a varying angle to other edges which over the entire length thereof are to be perpendicular to the plane of the plate. In order to facilitate the shifting from one burner to another or the starting of a burner when only the other has been in operation, it is preferred to locate the intersection between the burner 4 lying in the axis 8 of rotation of the burner head 7 and the axis of the inclined burner 5 in the plane of the upper surface of the plate and as far as possible to direct these two burners towards the same point. Thereby, no heating will be required before a burner starts its cutting operation, and no stop in the burning operation is required when shifting from a burning with one burner to a burning with the other burner or both burners.

A burner extending perpendicularly to the plate may thus also be used in heating the edge of the plate when a cut is initiated.

What I claim is:

1. A method of cutting an edge on structural sheet with an automatic cutter having a rotatable head and a cutting nozzle mounted thereon with its longitudinal axis inclined to the axis of rotation of said head and defining an angle of attack between said longitudinal axis and the plane of the sheet, the axis of the cutting nozzle and the rotatable axis of the head lying substantially in the same plane, the method comprising the steps of:

controlling the rotation of said head about an axis substantially perpendicular to the plane of the sheet during a cutting operation to obtain a desired longitudinal curvature of the edge to be cut;

superimposing a further controlled rotation on said head during said cutting operation to vary the angle of attack of said cutting nozzle and obtain a desired variable angle of cut between the plane of the sheet and the edge to be cut.

2. A method as claimed in claim 1 wherein the cutting nozzle is so positioned on said head that its longitudinal axis intersects the rotational axis of the head in the plane of the upper surface of the sheet.

3. A method as claimed in claim 1 wherein the cutting nozzle is so positioned on said head that its longitudinal axis intersects the rotational axis of the head in the plane of the lower surface of the sheet.

4. A method as claimed in claim 1 wherein said automatic cutter is controlled along three axes, each axis having independent control circuit means so that when said cutter is only required to be controlled along two axes, the control circuit means used for controlling said cutter along the third axis is used to control the angle of attack of the cutting nozzle.

5. A method as claimed in claim 1 wherein the step of superposing a further rotation on said head is stepwise controlled.

6. A method as claimed in claim 1 wherein said rotatable head has a further cutting nozzle affixed thereto the longitudinal axis of which lies substantially along the axis of rotation of said head; the method further comprising the steps of:

cutting a longitudinal edge on the sheet with said further nozzle, which over its entire length is perpendicular to the plane of said sheet.

References Cited
UNITED STATES PATENTS

| | | | |
|---|---|---|---|
| 3,206,180 | 9/1965 | Grubish | 148—9 |
| 1,787,247 | 12/1930 | Grow | 148—9 |
| 2,202,130 | 5/1940 | Wagner | 148—9 |
| 2,363,828 | 11/1944 | Anderson | 148—9 |
| 2,443,710 | 6/1948 | Rountree | 148—9 |
| 3,170,015 | 2/1965 | Ziebart | 148—9 |

WAYLAND W. STALLARD, Primary Examiner